US005969826A

United States Patent [19]
Dash et al.

[11] Patent Number: 5,969,826
[45] Date of Patent: Oct. 19, 1999

[54] AUTO-FUNCTION SWITCHING PROCESS FOR A MULTI-FUNCTIONAL MACHINE

[75] Inventors: Robert J. Dash, Victor; Donald J. Gusmano, Henrietta, both of N.Y.

[73] Assignee: Xerox Corporation, Stamford, Conn.

[21] Appl. No.: 08/786,593

[22] Filed: Jan. 21, 1997

[51] Int. Cl.[6] .................................................. H04N 1/00
[52] U.S. Cl. .......................... 358/400; 358/442; 358/498; 399/81; 399/85; 345/901; 345/905
[58] Field of Search ...................... 358/400, 468, 358/404, 498, 462, 442; 395/112, 117; 399/81, 85, 16, 17, 76, 1; 345/901, 905; H04N 1/00

[56] References Cited

U.S. PATENT DOCUMENTS

| | | | |
|---|---|---|---|
| 5,045,880 | 9/1991 | Evanitsky et al. | 345/173 |
| 5,208,676 | 5/1993 | Inui | 358/404 |
| 5,459,553 | 10/1995 | Kim | 355/203 |
| 5,761,485 | 6/1998 | Munyan | 395/500 |
| 5,796,496 | 8/1998 | Ono | 358/400 |

*Primary Examiner*—Edward L. Coles
*Assistant Examiner*—Derrick Fields
*Attorney, Agent, or Firm*—Michael J. Nickerson

[57] ABSTRACT

A system or method displays an appropriate user interface for a multi-function machine. A controller changes displayed contents of a user interface to display a functional screen corresponding to a copy-function when a document handler sensor senses a document placed in a document handler and changes the displayed contents of the user interface to display a functional screen corresponding to a facsimile-function when a telephone number sensor circuit senses a telephone being inputted through a ten-key pad. The controller also changes the display of the user interface to display a functional screen corresponding to a copy-function when a platen cover sensor senses a lifting of a platen cover. Lastly, the controller changes the display of the user interface to display a function screen corresponding to a print-function when a portable memory drive sensor senses an insertion of a portable memory device into a portable memory drive.

19 Claims, 8 Drawing Sheets

| Job # | Name | Type | Owner | Status | Priority |
|---|---|---|---|---|---|
| 1 | Copy Job 1 | Copy | Local | Printing | 3 |
| 2 | Word doc | Print | Smith | Pending | 4 |
| 3 | Fax Job 3 | Fax Print | 555-1212 | Pending | 5 |
| 4 | Options | Report | Local | Pending | 5 |

Ready

Promote | Release | Delete | Details | Change View

AUTO-FUNCTION SWITCHING PROCESS FOR A MULTI-FUNCTIONAL MACHINE

FIELD OF THE PRESENT INVENTION

The present invention relates to a method and apparatus for providing a proper user interface input screen for a multi-function machine. More specifically, the present invention is directed to a method and system for providing a proper user interface input screen based on non-user interface related actions taken by the operator.

BACKGROUND OF THE PRESENT INVENTION

Traditionally, copier, in the office equipment context, refers to light-lens xerographic copiers in which paper originals are in fact photographed. The images are focused on an area of a photoreceptor, which is subsequently developed with toner. The developed image on the photoreceptor is then transferred to a copy sheet which in turn is used to create a permanent copy of the original.

In recent years, there has been made available what is known as digital copiers. In the most basic functions, a digital copier performs the same functions as a light-lens copier, except that the original image to be copied is not directly focused on a photoreceptor. Instead, with a digital copier, the original image is scanned by a device generally known as a raster input scanner (RIS) which is typically in the form of the linear array of small photosensors.

The original image is focused on the photosensors in the RIS. The RIS converts the various light and dark areas of the original image to a set of digital signals. These digital signals are temporarily retained in a memory and then eventually used to operate a digital printing apparatus when it is desired to print copies of the original. The digital signals may also be sent directly to the printing device without being stored in memory. The digital printing apparatus can be any known type of printing system responsive to digital data, such as a modulating scanning laser which discharges image wise portions of a photoreceptor, or an ink jet printhead.

Moreover, with the advent of the digitalization of the office copier, there has also been made available a digital multi-function machine. The digital multi-function machine is a single machine which provides a user with more than one function. An example of a typical digital multi-function machine would include a digital facsimile function, a digital printing function, and a digital copying function. More specifically, a user can utilize this digital multi-function machine to send a facsimile of an original document to a remote receiving device, to scan in an original image and print copies thereof, and to print documents from either a networked source, locally connected source, or from a portable memory device which has been inserted into the multi-function machine.

Although a digital multi-function machine offers many advantages in that the user can utilize a variety of functions in a single machine, the digital multi-function machine also presents many problems. One such problem is the programming of the machine to carry out the desired function. For example, each of the functions described above requires a separate set of commands or programmed in attributes, and thus, the conventional digital multi-function machine must either have an expansive user interface with numerous keys, dials, or switches; a soft panel touch screen with a plurality of screens to provide all the various programming options; or a graphic user interface under the control of a keyboard and/or mouse or other pointing device.

More specifically, when a user is preparing to send a facsimile to a remote receiving device, the user must input the phone number or address of the remote receiving device as well as other attributes which are associated with a facsimile transmission by activating a plurality of hardwired buttons in a predetermined sequence or scroll through various screens to find the screens associated with the desired programming. On the other hand, when a user desires to make a desired number of copies of an original image, the user needs to program the multi-function machine with respect to the number of copies to be made, the contrast of the copies, the finishing aspects of the copies, the reduction or enlargement of the copies, etc., by activating a plurality of hardwired buttons in a predetermined sequence or scroll through various screens to find the screens associated with the desired programming. Lastly, if the user desires to print certain digital data from either a network source or an inserted removable memory device, the user needs to be able to program the attributes of this printing operation by activating a plurality of hardwired buttons in a predetermined sequence or scroll through various screens to find the screens associated with the desired programnming.

In any of these examples, the user encounters a complex time-consuming proposition that requires the user to have a very sophisticated knowledge of the operations of the multi-function machine in order to enable the user to program the multi-function machine to perform the proper functions and the time to find all the needed buttons or electronically flip through a variety of screens in order to find the proper functional screen which corresponds to the operations desired by the user. Therefore, it is desirable to have a multi-function machine wherein the operational attributes for a desired function are automatically displayed for the user in a timely and simple fashion. More specifically, it is desirable to have a multi-functional user interface which provides the proper functional screen to the user in a timely and simple manner in response to a non-user interface related preparatory action by the operator.

SUMMARY OF THE PRESENT INVENTION

One aspect of the present invention is a method for displaying an appropriate user interface for a multi-function machine. This method senses a non-user interface related preparatory action by a user of the multi-function machine and changes a screen of a user interface to display a functional screen corresponding to the sensed non-user interface related preparatory action.

A second aspect of the present invention is a system for displaying an appropriate user interface for a multi-function machine. This system includes a user interface, sensing means for sensing a non-user interface related preparatory action by a user of the multi-function machine, and control means, responsive to the sensing means, for changing a display of the user interface to display a functional screen corresponding to the sensed non-user interface related preparatory action.

A third aspect of the present invention is system for displaying an appropriate user interface for a multi-function machine. This system includes a user interface having a touch-sensitive display and a ten key pad, a document handler, a document handler sensor, a telephone number sensor circuit, and a controller, responsive the document handler sensor and the telephone number sensor circuit, to change displayed contents of the user interface to display a functional screen corresponding to a copy function when the document handler sensor senses a document placed in the document handler and to change the displayed contents of the user interface to display a functional screen corresponding to a facsimile function when the telephone number sensor circuit senses a telephone number is being inputted through the ten key pad.

Further objects and advantages of the present invention will become apparent from the following description of the various embodiments and characteristic features of the present invention.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

The following will be a detailed description of the drawings illustrating the present invention. In this description, as well as in the drawings, like reference numerals represent like devices, circuits, or equivalent circuits which perform the same or equivalent functions.

As noted above, FIG. 1 illustrates a side view of a multi-function machine. The multi-function machine 1 includes a conventional platen cover 3 and conventional platen glass 13 between which an original document can be placed for a platen scanning routine. Moreover, the multi-function machine includes a conventional document handler 7 which has an input tray 9 and an output tray 11. The document handler 7 can place an original, residing in the input tray 9, on the platen glass 13 for scanning. After the scanning operation, the document handler 7 removes the original document from the platen glass 13 and places it in the output tray 11.

Figure 1:
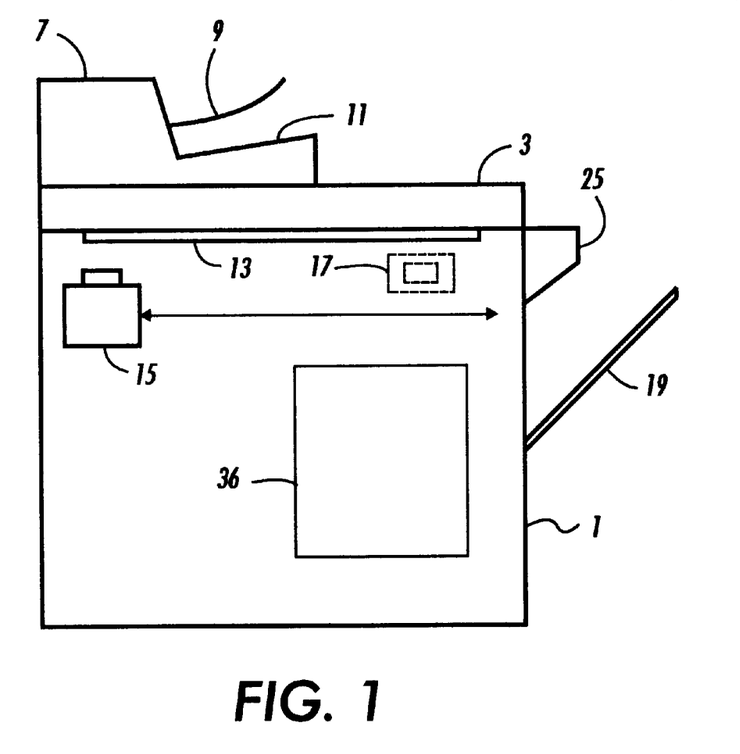
FIG. 1 shows a side view of a multi-function machine.

The scanning process of the multi-function machine is carried out by a conventional scanning device 15. The scanning device 15 can either move across the original document placed on the platen glass 13 during a platen scanning operation, or the scanning device 15 can be parked in a stationary position if the multi-function machine is equipped with a constant velocity transport (CVT) system which moves the original document past the scanning station. In a preferred embodiment of the present invention, the scanning device 15 is a CCD sensor array; however, the scanning device can also be a conventional full width array sensor.

The multi-function machine 1 also includes a drive device 17 which is capable of receiving a portable memory device. In the preferred embodiment of the present invention, the portable memory device is a floppy disk; however, the portable memory device may also be a compact disk or other type of recording medium such as a magnetic tape which can be carried from one place to another reliably and capable of storing digital data to be printed by a printing apparatus. Lastly, the multi-function machine includes an output tray 19 which receives the printed images from a conventional digital printing apparatus 36.

Figure 2:
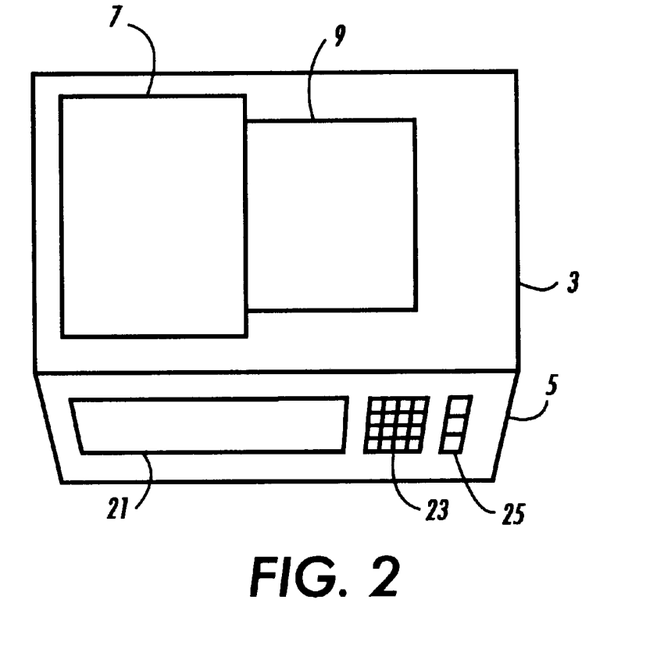
FIG. 2 shows a top view of a multi-function machine.

FIG. 2 illustrates a top view of a multi-function machine. As illustrated in FIG. 2, the multi-function machine includes the document handler 7 which has the original document input tray 9. The document handler 7 resides on to platen cover 3 which covers the platen glass associated with a scanning station (not shown). The multi-function machine 1 also includes a user interface wing or ledge 5. In the preferred embodiment of the present invention, the user interface wing 5 includes a conventional touch-sensitive display screen 21 which allows the user to program jobs into the multi-function machine by touching activatable areas on the display screen. The user interface wing 5 may also include a conventional hardwired ten key pad 23 and a small number of hardwired buttons associated with specific functions of a multi-function machine. Examples of the screens displayed by the touch sensitive screen 21 are illustrated in FIGS. 8–11.

Figure 8:
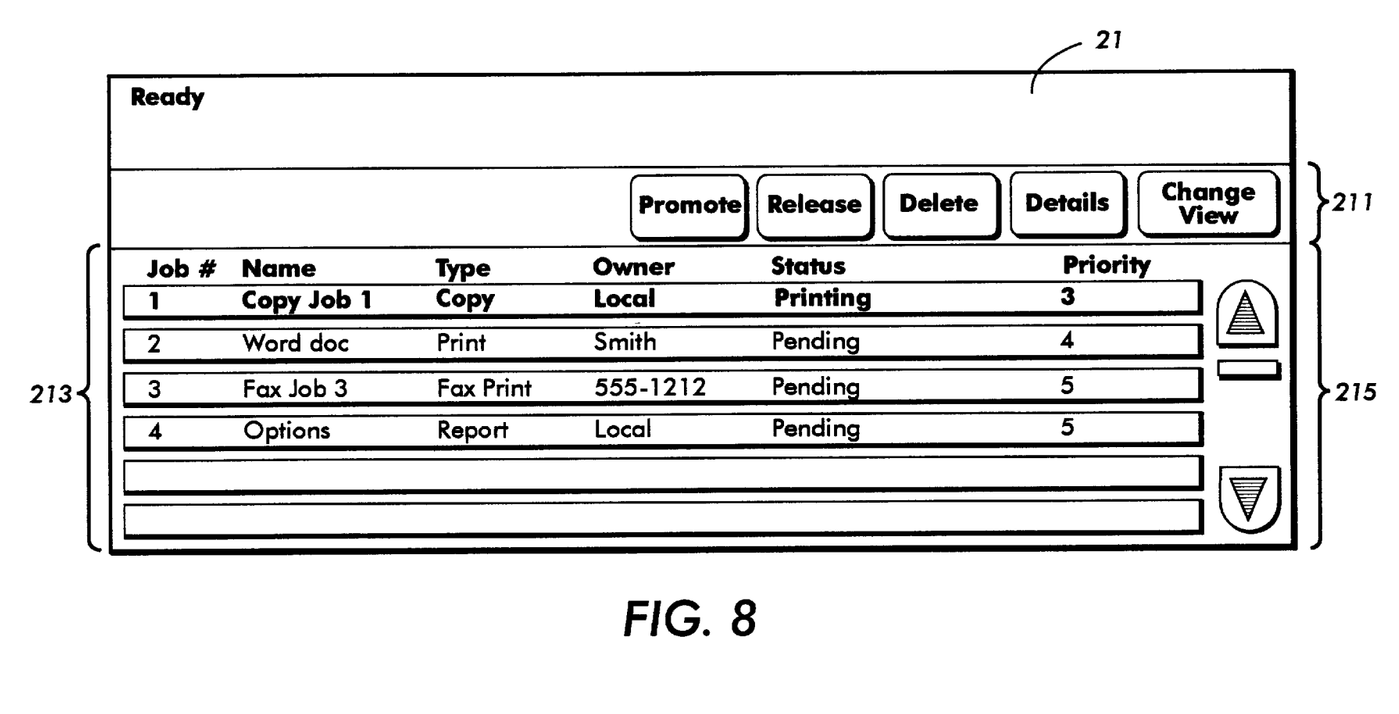
FIG. 8 illustrates a functional screen corresponding to a printing operation according to the present invention.

More specifically, FIG. 8 illustrates a functional display screen 21 for allowing a user to program the attributes and desired operations corresponding with a printing function according to a preferred embodiment of the present invention. The printing function display screen 21 includes a plurality of buttons 211 wherein each button corresponds to a specific operation or function corresponding to a printing mode or other function of the multi-function machine. Moreover, in the preferred embodiment of the present invention, the printing function display screen 21 includes a display area 213 which displays the printing queue for the multi-function machine. Lastly, the printing function display screen 21 includes scrolling area 215 wherein scroll buttons allow the user to scroll through the printing queue screen so as to select a desired job for which the user desires to program certain attributes.

Figure 9:
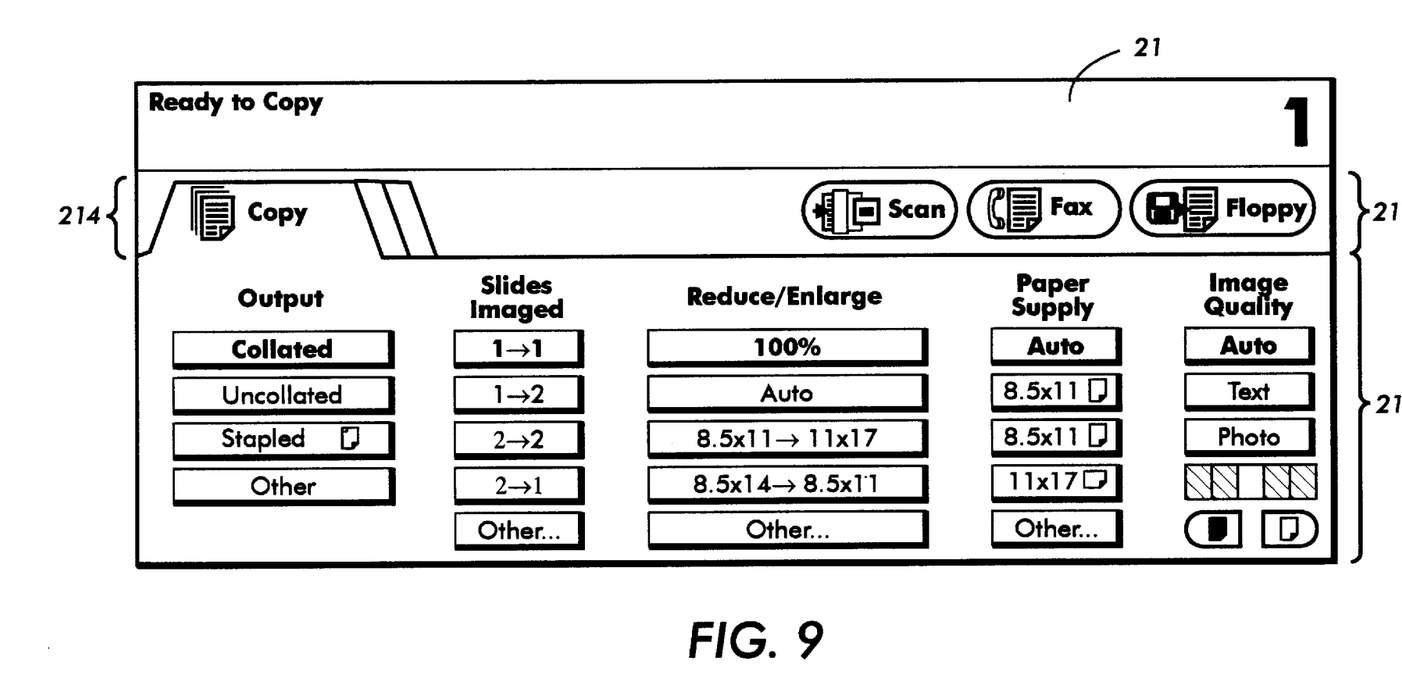
FIG. 9 illustrates a functional screen corresponding to a copy operation according to the present invention.

With respect to FIG. 9, FIG. 9 illustrates a functional screen 21 corresponding to a copy operation according to a preferred embodiment of the present invention. This functional screen 21 includes a button area 217 which allows the user to bring up any of the other functional screens associated with the multi-function machine. Moreover, the functional screen 21 includes an attribute folder 219 which has a plurality of activatable areas that allows a user to program various characteristics and attributes of a copying operation. The functional screen 21 also includes a tab area 214 which allows the user to select any of the various folders which may be associated with the copying function.

Figure 10:
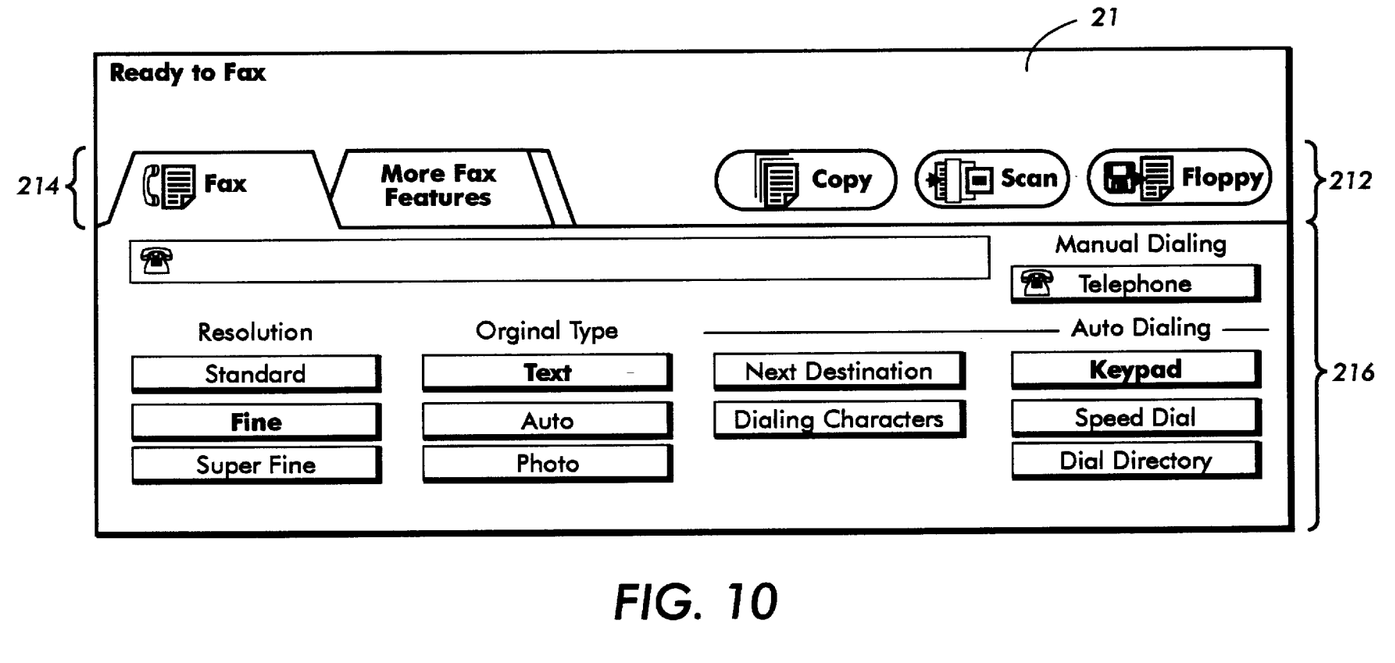
FIG. 10 illustrates a functional screen corresponding to a facsimile operation according to the present invention.

On the other hand, FIG. 10 illustrates a functional screen 21 corresponding to a facsimile function according to a preferred embodiment of the present invention. This functional screen 21 also includes a button area 212 which allows the user to select one of the other various functional screens associated with the multi-function machine. The functional screen 21 also includes a tab area 214 which allows the user to select any of the various folders which may be associated with the facsimile function. Lastly, the functional screen 21 includes a folder area 216 that has a plurality of activatable areas that allows the user to program the various attributes and characteristics of a facsimile job.

Figure 11:
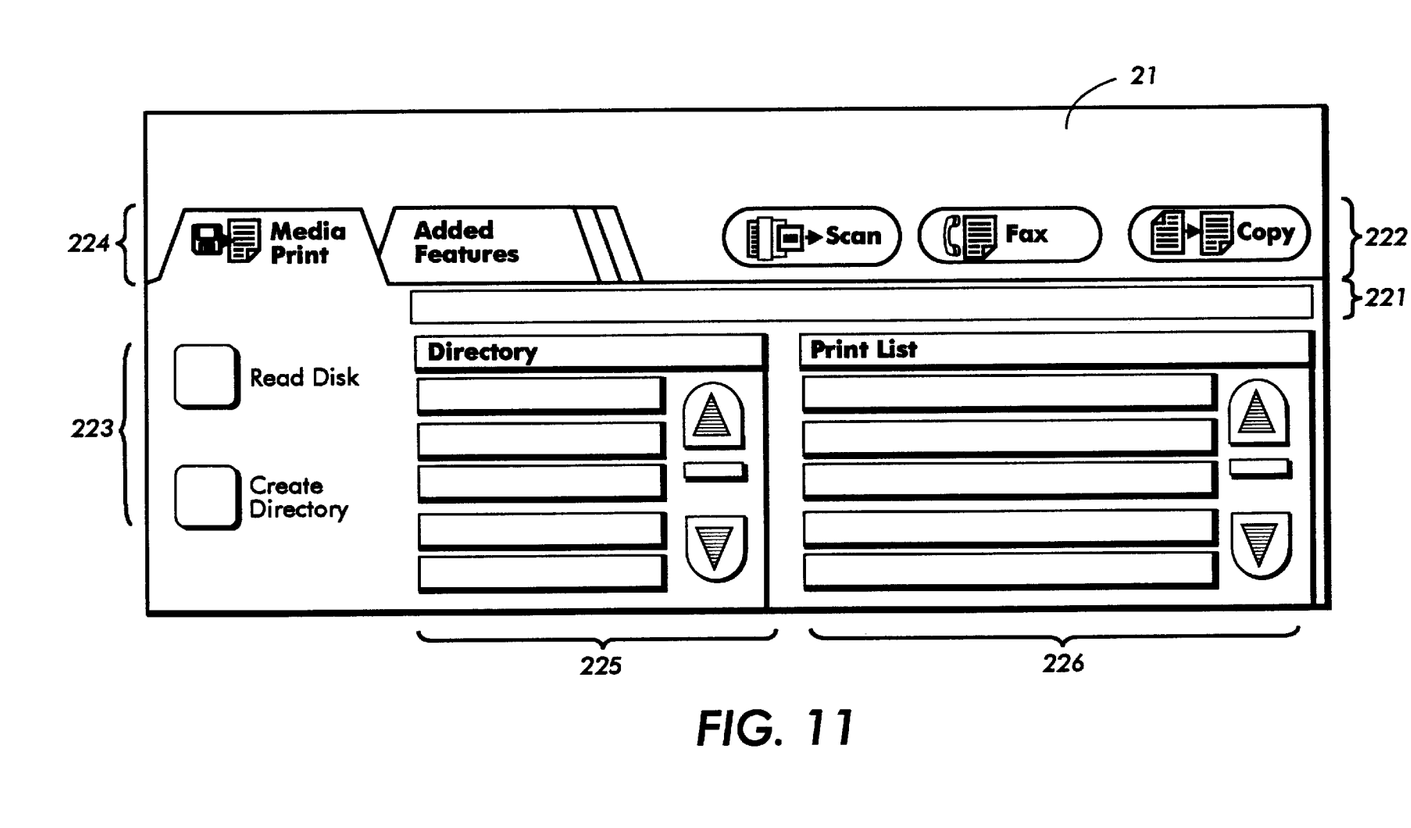
FIG. 11 illustrates a functional screen corresponding to a print media operation according to the present invention.

Lastly, FIG. 11 illustrates a functional display screen 21 for allowing a user to select the desired documents from a storage media to be printed and to program the attributes and desired operations corresponding with the printing function according to a preferred embodiment of the present invention. The media print function display screen 21 includes a plurality of buttons 222 wherein each button corresponds to a specific function of the multi-function machine. Moreover, in the preferred embodiment of the present invention, the media print function display screen 21 includes a display area 221 which displays the selected item to be printed and scroll areas 225 and 226 which enables the user to scroll through the documents on the storage media to enable selection. The media print function display screen 21 further includes a display area 223 which displays activatable soft buttons that enables a user to select specific functions corresponding to retrieving information from a storage media. The functional screen 21 also includes a tab area 224 which allows the user to select any of the various folders which may be associated with the print function.

As stated above, it is desirable for a multi-function machine to display the proper functional screen in a timely and simple fashion. More specifically, it is desirable for the multi-function machine to display the proper functional screen in response to a non-user interface related preparatory action by the user.

For example, the multi-function machine should display the functional screen associated with a copy function as soon as the user places the original documents in a document handler. The user should not have to place the documents in the document handler and then electronically flip or scroll through a variety of functional screens in order to find the proper copy function screen that will allow the user to program the proper attributes and characteristics of the copy job. To realize this, the present invention monitors a plurality of non-user interface related preparatory actions so that the multi-function machine can timely and simply display the proper functional screen.

A non-user interface related preparatory action by the user is an action taken by the user which is not related to the user interface that is in preparation for carrying a specific job. Examples of non-user interface related preparatory actions are: lifting a platen cover, placing a document onto a platen glass, laying a document in a document feeder, adjusting a paper guide on a document handler, inserting a portable memory device into a drive, dialing a phone number, lifting a telephone handset, etc. On the other hand, examples of user interface related preparatory actions are: activating a start button or activatable area, activating a screen selection button or activatable area, keying into a number of desired copies, activating a button or activatable area associated with a programmable attribute.

However, if the ten key pad for dialing a telephone number is part of the default display screen of a touch-sensitive display, the entering of a telephone number through this key pad would be considered a non-user interface related preparatory action; whereas the entering of a copy number through the same key pad would be considered a user interface related preparatory action. In this situation, the screen will be either a copy function related screen or a facsimile function related screen based on how many buttons are pressed or activated on the 10 digital keypad. The determination of the screen type can also be based on the actual number entered or keys pressed, such as the # key or the * key.

Figure 3:
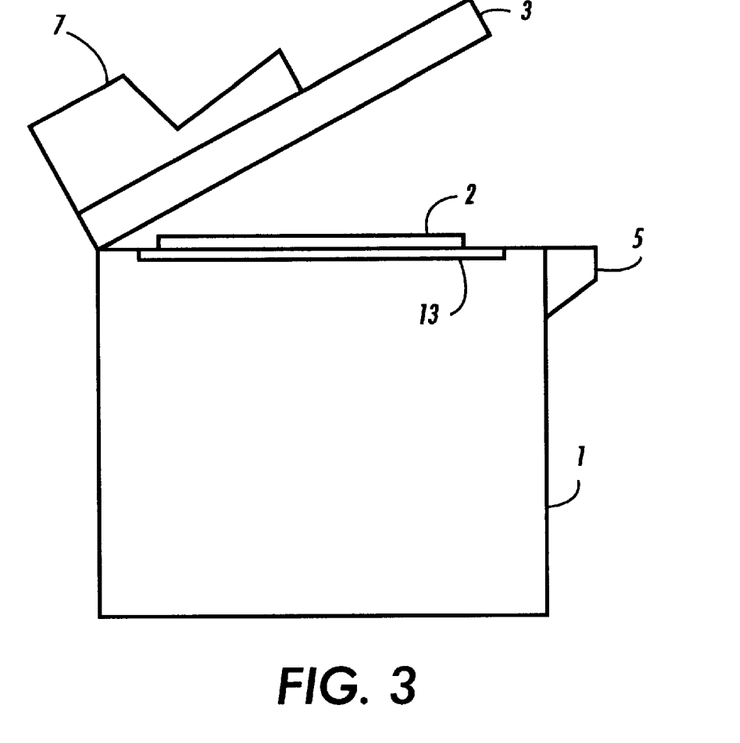
FIG. 3 illustrates a platen cover opened condition for a multi-function machine according to the concepts of the present invention.
Figure 7:
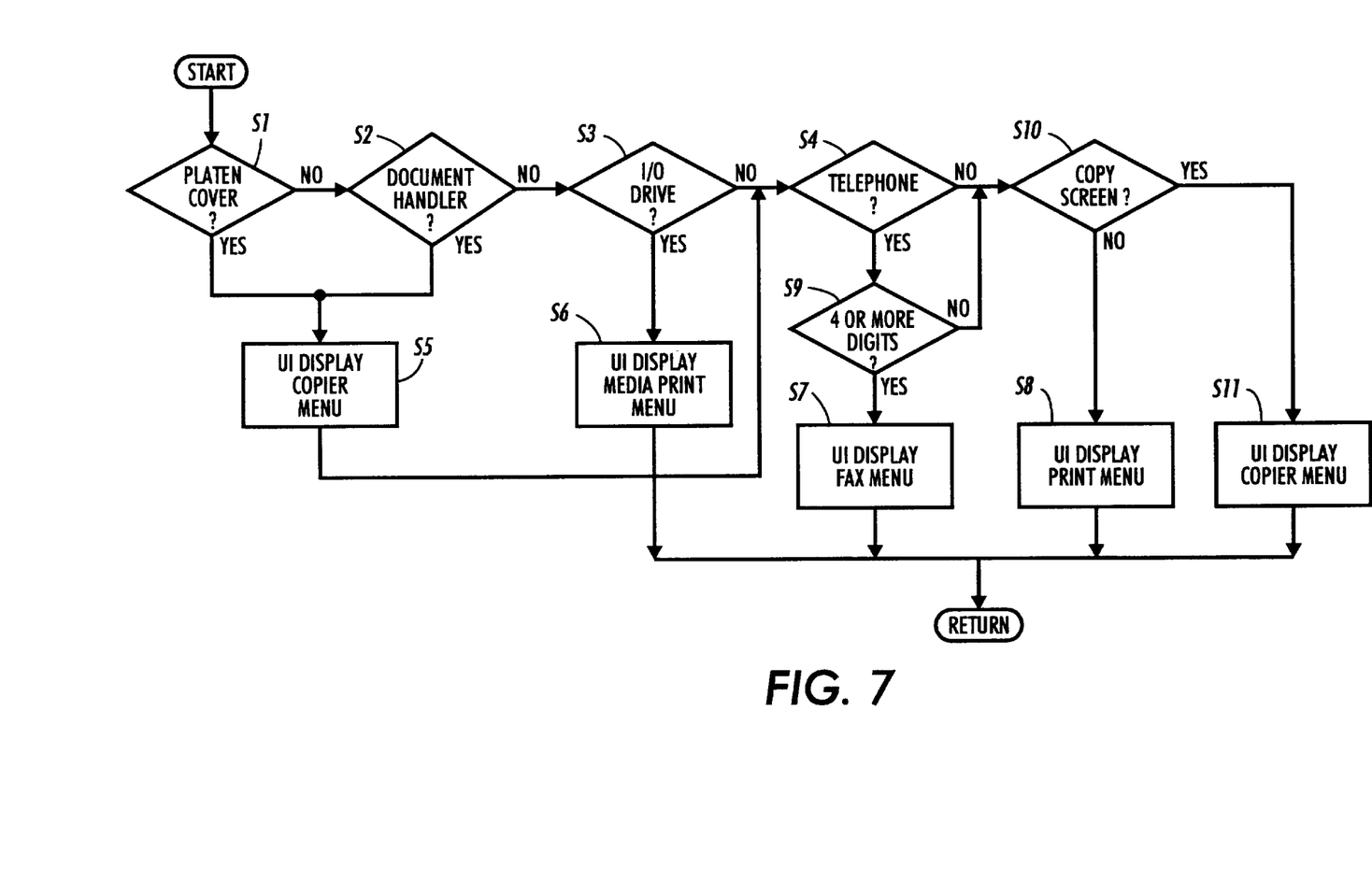
FIG. 7 is a flowchart illustrating an auto-switching process according to the present invention.

The present invention carries out a process which senses the non-user interface related preparatory action and displays the proper functional screen in response thereto. As illustrated in FIG. 7, initially at set S1, the present invention senses whether the platen cover of a multi-function machine has been opened. An example of this non-user interface related preparatory action is illustrated in FIG. 3. As shown in FIG. 3, the platen cover 3 of a multi-function machine 1 has been lifted so that the user can place a document 2 upon the platen glass 13. This lifting of the platen cover in preparation of a copy operation is defined as a non-user interface related preparatory action. If step S1 senses such an event, step S5 causes the user interface on the user interface wing 5 of FIG. 3 to display a functional screen associated with a copier menu, such as the functional screen illustrated in FIG. 9.

Figure 5:
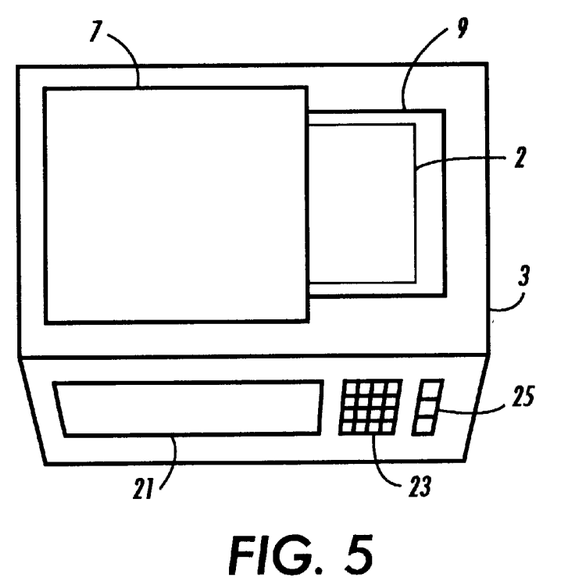
FIG. 5 illustrates a document handler engagement condition for a multi-function machine according to the concepts of the present invention.

If step S1 does not sense the lifting of a platen cover, step S2 senses whether a document has been placed in a document handler. Such a condition is illustrated in FIG. 5. As shown in FIG. 5, this non-user interface related preparatory action corresponds to the placement of an original document 2 in the input tray 9 of a document handler 7 of a multi-function machine 1. If step S2 senses this non-user interface related preparatory action by the user, step S5 causes the display screen 21 of FIG. 5 to display a functional screen corresponding to a copier menu, such as the functional screen illustrated in FIG. 9 and the process moves onto step S4.

Figure 4:
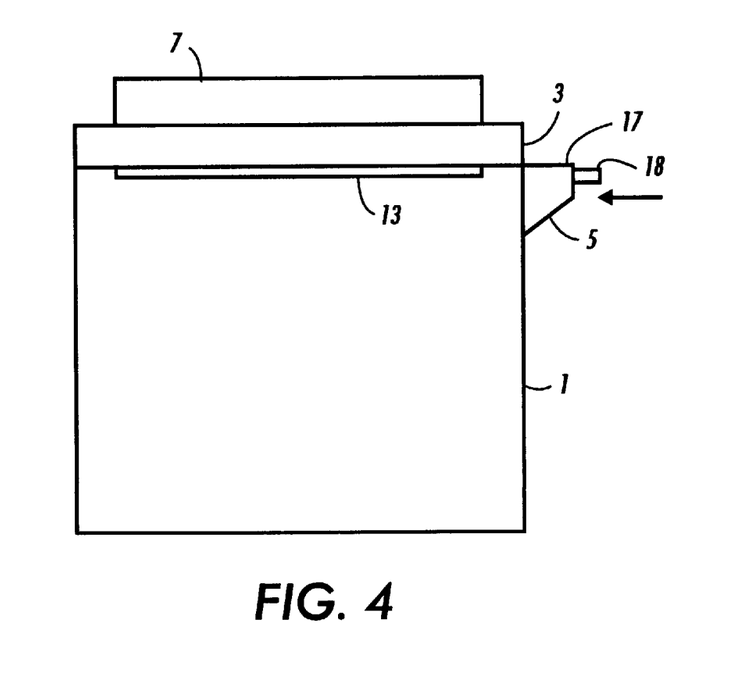
FIG. 4 illustrates a portable memory insertion condition for a multi-function machine according to the concepts of the present invention.

If step S2 does not sense an original document being placed in the document handler, step S3 senses whether a portable memory device has been inserted into an input/output drive. Such a non-user interface related preparatory action is illustrated in FIG. 4. As shown in FIG. 4, a portable memory device 18 is inserted into a portable memory drive 17 of a multi-function machine 1. If step S3 senses such an insertion, step S6 causes the user interface screen on the user interface wing 5 to display a functional screen corresponding to a media print menu, such as that illustrated in FIG. 11.

If step S3 does not sense the insertion of a portable memory device into a portable memory drive or steps S1 and S2 make positive determinations, step S4 senses whether a number has been entered through the digital 10 keypad by the user with the use of a conventional number sensing circuit or a telephone handset has been lifted from its cradle. If a number has been entered or a telephone handset has been lifted from its cradle, step S9 determines if the number has more than 4 digits or if a certain key relating to a telephonic operation, such as a # or * key, has been activated. If step S9 determines that the number has more than 4 digits or that a certain key relating to a telephonic operation, such as a # or * key, has been activated, step S7 causes the screen of the user interface to display a functional screen corresponding to a facsimile menu, such as the functional screen illustrated in FIG. 10.

On the other hand, if step S9 does not determine that the number has more than 4 digits or that a certain key relating to a telephonic operation, such as a # or * key, has been activated, the process goes to step S10 which determines is step S5 has been carried out. If step S10 makes a positive determination, step S11 causes the display screen to display a screen relating to a copy function as illustrated in FIG. 9. If step S10 does not make a positive determination, step S8 causes the user interface to display a functional screen corresponding to a print menu, such as illustrated in FIG. is 8.

Figure 6:
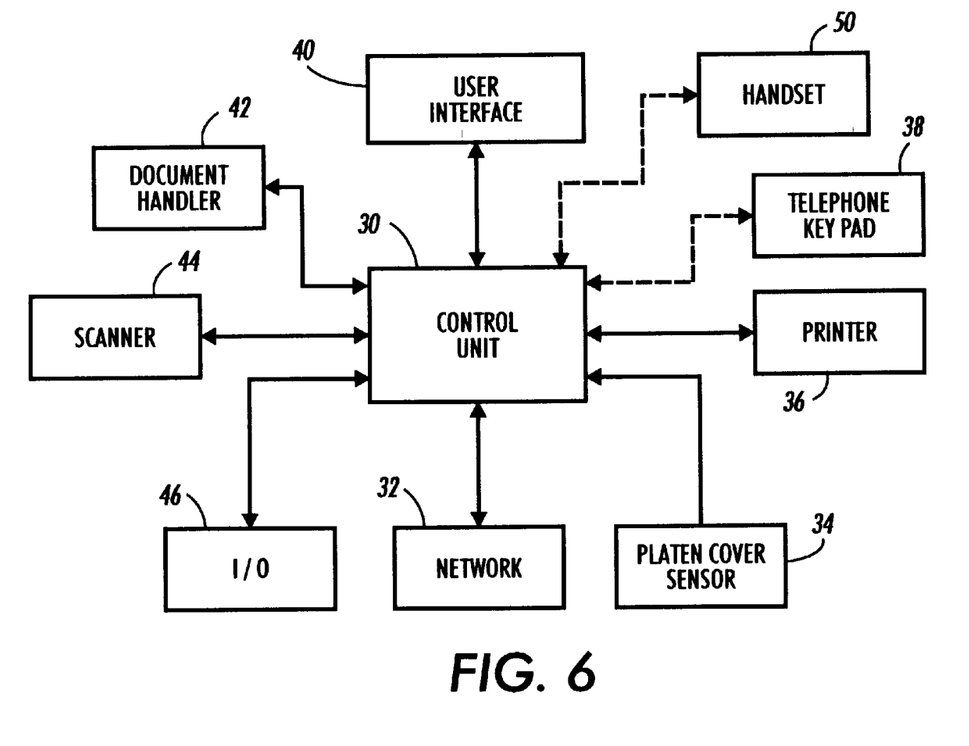
FIG. 6 is a block diagram illustrating an architecture for a multi-function machine according to the present invention.

FIG. 6 illustrates a block diagram of the architecture for a multi-function machine according to the concepts of the present invention. As illustrated in FIG. 6, a control unit 30 controls all the operations of the multi-function machine. The control unit 30 is connected to a scanning unit 44 which scans the original documents to produce a digital representation of the images on the original documents. The control 30 can also be connected to a network to allow the receipt of remote facsimile jobs, print jobs, or copy jobs. An input/output drive 46 is connected to the control unit 30 which allows the multi-function machine to print jobs which may have been stored on a portable memory device such as a floppy disk, compact disk, or magnetic tape.

The multi-function machine may also include a document handler 42 which is connected to the control unit 30. The document handler 42, according to the concepts of the present invention, would include a sensor for sensing the placement of the original documents in the input tray of the document handler so as to inform the control unit when the user has taken this non-user interface related preparatory action. The document handler 42 may also include a sensor to sense adjustments to paper guides within the input tray so as to inform the control unit when the user has taken this non-user interface related preparatory action. A platen cover sensor 34 is also connected to the control unit to inform the control unit when the platen cover of the multi-function machine has been opened to allow the user to place an original document on the platen glass.

Moreover, either a handset 50 or a telephone keypad 38 is connected to the control unit 30 so as to allow the user to program in a remote telephone number or address to be utilized in a facsimile job carried out by the multi-function machine. A user interface 40 is connected to the control unit 30 which enables the user to program in various attributes and characteristics of the jobs to be carried out by the multi-function machine. Lastly, a printer 36 is connected to the control unit 30 which produces the printed output for the multi-function machine.

In summary, the present invention senses a non-user interface related preparatory action performed by a user of a multi-function machine and provides the proper functional screen for the touch-sensitive display corresponding to the function related to the sensed non-user interface related preparatory action in a timely fashion.

Although the present invention has been described in detail above, various modifications can be implemented without departing from the spirit of the present invention. For example, the preferred embodiment of the present invention has been described with respect to a specific set of non-user interface related preparatory actions. However, the present invention can be carried out based on other non-user interface related preparatory actions wherein each action is associated with a functional screen.

Moreover, a combination of non-user interface related actions may be used to determine the correct functional screen. For example, the combination of placing a document in a document handler and dialing a telephone will activate the displaying of the functional screen relating to a facsimile operation.

While the present invention has been described with reference to various embodiments disclosed above, it is not confined to the details to support the above, but is intended to cover such modification or changes as may come within the scope of the attached claims.

What is claimed is:

1. A method for displaying an appropriate user interface for a multi-function machine comprising the steps of:
   (a) sensing a non-user interface related preparatory action by a user of the multi-function machine; and
   (b) changing a display of a user interface to display a functional screen corresponding to the sensed non-user interface related preparatory action.

2. The method as claimed in claim 1, wherein the non-user interface related preparatory action is lifting a platen cover and the displayed functional screen is a copy-function screen.

3. The method as claimed in claim 1, wherein the non-user interface related preparatory action is placing a document into a document handler and the displayed functional screen is a copy-function screen.

4. The method as claimed in claim 1, wherein the non-user interface related preparatory action is keying-in a telephone number and the displayed functional screen is a facsimile-function screen.

5. The method as claimed in claim 1, wherein the non-user interface related preparatory action is lifting a handset and the displayed functional screen is a facsimile-function screen.

6. The method as claimed in claim 1, wherein the non-user interface related preparatory action is inserting a floppy disk into a drive and the displayed functional screen is a print media-function screen.

7. The method as claimed in claim 1, wherein the non-user interface related preparatory action is inserting a compact disk into a drive and the displayed functional screen is a print media-function screen.

8. The method as claimed in claim 1, wherein the non-user interface related preparatory action is inserting a portable memory device into a drive and the displayed functional screen is a print media-function screen.

9. The method as claimed in claim 1, further comprising the steps of:
   (c) sensing a second non-user interface related preparatory action by a user of the multi-function machine; and
   (d) changing the user interface screen to display a function screen corresponding to the sensed second non-user interface related preparatory action.

10. A system for displaying an appropriate user interface for a multi-function machine, comprising:
    a user interface;
    sensing means for sensing a non-user interface related preparatory action by a user of the multi-function machine; and
    control means, responsive to said sensing means, for changing a display of said user interface to display a functional screen corresponding to the sensed non-user interface related preparatory action.

11. The system as claimed in claim 10, further comprising:
    a platen cover;
    said sensing means is a sensor to sense lifting of said platen cover;
    said control means changing the display of said user interface to display a copy-function screen when said platen cover is lifted.

12. The system as claimed in claim 10, further comprising:

a document handler;

said sensing means is a sensor to sense placing a document into said document handler;

said control means changing the display of said user interface to display a copy-function screen when a document is placed in said document handler.

13. The system as claimed in claim 10, further comprising:

a ten key pad;

said sensing means is a telephone number sensor circuit to sense the dialing of a telephone number;

said control means changing the display of said user interface to display a facsimile-function screen when a telephone number is entered through the ten key pad.

14. The system as claimed in claim 10, further comprising:

a floppy disk drive;

said sensing means is a sensor to sense insertion of a floppy disk into said floppy disk drive;

said control means changing the display of said user interface to display a print media-function screen when a floppy disk is inserted into said floppy disk drive.

15. The system as claimed in claim 10, further comprising:

a portable memory drive;

said sensing means is a sensor to sense insertion of a portable memory into said portable memory drive;

said control means changing the display of said user interface to display a print media-function screen when a portable memory is inserted into said portable memory drive.

16. The system as claimed in claim 10, wherein said sensing means senses a second non-user interface related preparatory action by a user of multi-function machine and said control means changes a display of said user interface to display a functional screen corresponding to the second sensed non-user interface related preparatory action.

17. A system for displaying an appropriate user interface for a multi-function machine, comprising:

a user interface having a touch-sensitive display and a ten key pad;

a document handler;

a document handler sensor;

a telephone number sensor circuit; and a controller;

said controller, responsive to said document sensor and said telephone number sensor circuit, changing displayed contents of said user interface to display a functional screen corresponding to a copy-function when said document handler sensor senses a document placed in said document handler and changing the displayed contents of said user interface to display a functional screen corresponding to a facsimile-function when said telephone number sensor circuit senses a telephone being inputted through said ten-key pad.

18. The system as claimed in claim 17, further comprising:

a platen cover; and a platen cover sensor;

said control means, responsive to said platen cover sensor, changing the display of said user interface to display a functional screen corresponding to a copy-function when said platen cover sensor senses a lifting of said platen cover.

19. The system as claimed in claim 17, further comprising:

a portable memory drive; and a portable memory drive sensor;

said control means, responsive to said portable memory drive sensor, changing the display of said user interface to display a function screen corresponding to a print media-function when said portable memory drive sensor senses an insertion of a portable memory device into said portable memory drive.

\* \* \* \* \*